(12) United States Patent
Okano

(10) Patent No.: US 10,140,528 B2
(45) Date of Patent: Nov. 27, 2018

(54) LANE DETECTION APPARATUS AND LANE DETECTION METHOD

(71) Applicant: DENSO CORPORATION, Kariya, Aichi-pref. (JP)

(72) Inventor: Kenji Okano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 123 days.

(21) Appl. No.: 15/327,611

(22) PCT Filed: Jul. 9, 2015

(86) PCT No.: PCT/JP2015/003481
§ 371 (c)(1),
(2) Date: Jan. 19, 2017

(87) PCT Pub. No.: WO2016/013174
PCT Pub. Date: Jan. 28, 2016

(65) Prior Publication Data
US 2017/0147889 A1    May 25, 2017

(30) Foreign Application Priority Data
Jul. 24, 2014    (JP) ................. 2014-151052

(51) Int. Cl.
| G06K 9/00 | (2006.01) |
| G06K 9/62 | (2006.01) |
| H04N 7/18 | (2006.01) |
| G06K 9/20 | (2006.01) |
| G06T 7/73 | (2017.01) |
| G08G 1/16 | (2006.01) |

(52) U.S. Cl.
CPC ......... *G06K 9/00798* (2013.01); *G06K 9/209* (2013.01); *G06K 9/6203* (2013.01); *G06K 9/6293* (2013.01); *G06T 7/73* (2017.01); *H04N 7/181* (2013.01); *H04N 7/188* (2013.01); *G06T 2207/30256* (2013.01); *G08G 1/167* (2013.01)

(58) Field of Classification Search
CPC ... G06K 9/00798; G06K 9/209; G06K 9/6203
USPC ........................................................ 348/148
See application file for complete search history.

(56) References Cited

U.S. PATENT DOCUMENTS

| 2008/0192984 A1 * | 8/2008 | Higuchi ................. G08G 1/16 382/104 |
| 2010/0060735 A1 | 3/2010 | Sato |

FOREIGN PATENT DOCUMENTS

JP        2010-79573 A      4/2010

* cited by examiner

*Primary Examiner* — Jeffery A Williams
(74) *Attorney, Agent, or Firm* — Knobbe, Martens, Olson & Bear, LLP

(57) ABSTRACT

A lane detection apparatus that detects a lane along which a vehicle travels includes: a side detection portion that detects a side lane division existing on a side of the vehicle; a front detection portion that detects a front lane division existing in front of the vehicle; a traveling speed detection portion that detects a traveling speed of the vehicle; a position correction portion that corrects a position of the front lane division based on a time lag of imaging timing between the side vehicle onboard camera and the front vehicle onboard camera, and the traveling speed; a checkup portion that compares a position of the side lane division and a corrected position of the front lane division; and an output portion that outputs the position of the side lane division as a detection result.

6 Claims, 17 Drawing Sheets

IMAGE BY REAR CAMERA

LANE DETECTION APPARATUS AND LANE DETECTION METHOD

CROSS REFERENCE TO RELATED APPLICATIONS

The present application is based on Japanese Patent Application No. 2014-151052 filed on Jul. 24, 2014, the disclosure of which is incorporated herein by reference.

TECHNICAL FIELD

The present disclosure relates to a technology detecting a travelling lane on the basis of analysis of an image captured by a vehicle onboard camera.

BACKGROUND ART

A road for a traveling vehicle is divided by a white line or other types of marks into multiple lanes. A vehicle is required to travel within a lane. A vehicle is equipped with an vehicle onboard camera for detecting a lane division (such as a white line, a curbstone, and a center divider) beforehand based on a front image captured by the vehicle onboard camera to give a warning to a driver when the vehicle is to deviate from the lane against intension of the driver.

When a vehicle travels along a lane, a lane division (such as a white line) which is detected on a front of the vehicle passes through the side of the vehicle. Accordingly, there is proposed a technology which analyzes a side image captured from a vehicle to detect a white line or the like existing on the side of the vehicle, instead of detecting a white line or the like based on a front image (Patent Literature 1). Since the white line or the like existing on the side of the vehicle is located close to the vehicle, it is supposed that the white line or the like is detectable with higher positional accuracy in comparison with the white line or the like existing in front of the vehicle.

The inventor of the present application has found the following. The technology for detecting a white line or the like based on analysis of a side image captured from a vehicle may erroneously detect a white line or the like. In this case, it may be difficult to secure sufficient reliability.

An image conventionally used for detecting a white line or the like is a relatively far image in the traveling direction (a front direction) of the vehicle, and the detected white line or the like is located far away from the vehicle. By contrast, a white line or the like contained in a side image is located close to the vehicle. The position of the white line or the like contained in the front image does not widely shift within the image even during high-speed traveling of the vehicle. However, the position of the white line or the like in the side image may shift widely and rapidly. Accordingly, the white line or the like contained in the side image may become difficult to track during traveling of the vehicle. Moreover, a situation that a shadow of the vehicle, a connection of the road surface or the like appears in the side image in parallel with the white line or the like may occur. In this case, tracking of the white line or the like may be difficult, and distinction between the white line or the like and the objects other than the white line or the like may also become difficult. During detection of the white line or the like from the side image, the white line or the like may be lost sight, an object other than the white line may be erroneously detected, and it may be difficult to secure sufficient reliability.

PRIOR ART LITERATURE

Patent Literature

Patent Literature 1: JP 2010-79573 A

SUMMARY OF INVENTION

It is an object of the present disclosure to provide a technology enabling to detect a lane division with high reliability based on a side image captured from a vehicle.

According to one aspect of the present disclosure, a lane detection apparatus mounted on a vehicle including a plurality of vehicle onboard cameras and detecting a lane along which the vehicle travels, based on analysis of images captured by the plurality of vehicle onboard cameras, is provided. The lane detection apparatus includes: a side detection portion that detects a side lane division existing on a side of the vehicle, based on an image captured by a side vehicle onboard camera imaging an area around the side of the vehicle; a front detection portion that detects a front lane division existing in front of the vehicle, based on an image captured by a front vehicle onboard camera imaging an area around the front of the vehicle; a traveling speed detection portion that detects a traveling speed of the vehicle; a position correction portion that corrects a position of the front lane division based on a time lag of imaging timing between the side vehicle onboard camera and the front vehicle onboard camera, and the traveling speed; a checkup portion that compares a position of the side lane division and a corrected position of the front lane division; and an output portion that outputs the position of the side lane division as a detection result when the position of the side lane division and the corrected position of the front lane division are matched with each other.

According to another aspect of the present disclosure, a lane detection method that detects a lane along which a vehicle travels, based on analysis of images captured by a plurality of vehicle onboard cameras, is provided. The lane detection method includes: a side detection step that detects a side lane division existing on a side of the vehicle, based on an image captured by a side vehicle onboard camera imaging an area around the side of the vehicle; a front detection step that detects a front lane division existing in front of the vehicle, based on an image captured by a front vehicle onboard camera imaging an area around the front of the vehicle; a traveling speed detection step that detects a traveling speed of the vehicle; a position correction step that corrects a position of the front lane division based on a time lag of imaging timing between the side vehicle onboard camera and the front vehicle onboard camera, and the traveling speed; a checkup step that comparing a position of the side lane division and a corrected position of the front lane division; and an output step that outputs the position of the side lane division as a detection result when the position of the side lane division and the corrected position of the front lane division are matched with each other.

According to the lane detection apparatus and the lane detection method of the present disclosure, a lane division is detectable with high reliability based on a side image captured from a vehicle.

BRIEF DESCRIPTION OF DRAWINGS

The above and other objects, features, and advantages of the present disclosure will become more apparent from the following detailed description with reference to the accompanying drawings, in the drawings.

DESCRIPTION OF EMBODIMENTS (Configuration of Apparatus)

Figure 1:
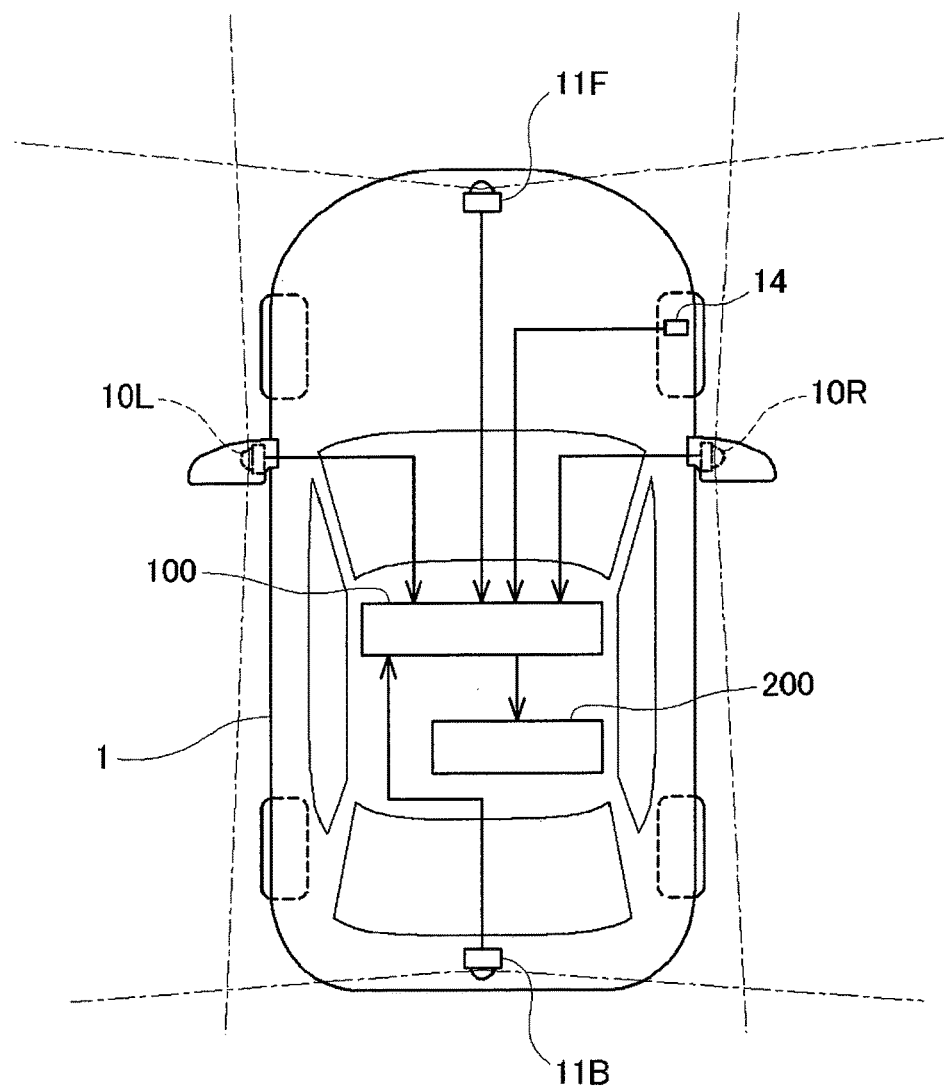
FIG. 1 is a view illustrating a vehicle including a lane detection apparatus.

FIG. 1 illustrates a vehicle 1 equipped with a lane detection apparatus 100. As illustrated in FIG. 1, the vehicle 1 includes a left side camera 10L which images an area (a surround of the left side) around the left side from the vehicle 1, and a right side camera 10R which images an area (a surround of the right side) around the right side, a front camera 11F which images an area (a surround of the front) around the front from the vehicle 1, a rear camera 11B which images an area (a surround of the rear) around the rear, and a vehicle speed sensor 14 which detects a traveling speed of the vehicle 1, in addition to the lane detection apparatus 100.

In the present embodiment, the left side camera 10L and the right side camera 10R correspond to a side vehicle onboard camera. The front camera 11F corresponds to a front vehicle onboard camera. The rear camera 11B corresponds to a rear vehicle onboard camera.

Images captured by the left side camera 10L, the right side camera 10R, the front camera 11F, and the rear camera 11B, and an output from the vehicle speed sensor 14 are input to the lane detection apparatus 100 to detect a lane by a method described below. The lane detection apparatus 100 outputs information on the detected lane to a vehicle control apparatus 200.

The vehicle control apparatus 200 gives a warning to a driver, or assists the driver to operate a steering wheel in a direction for maintaining the vehicle within the lane, for example, when the vehicle control apparatus 200 determines based on the received information that the driver is to deviate from the lane against the intention of the driver.

Figure 2:
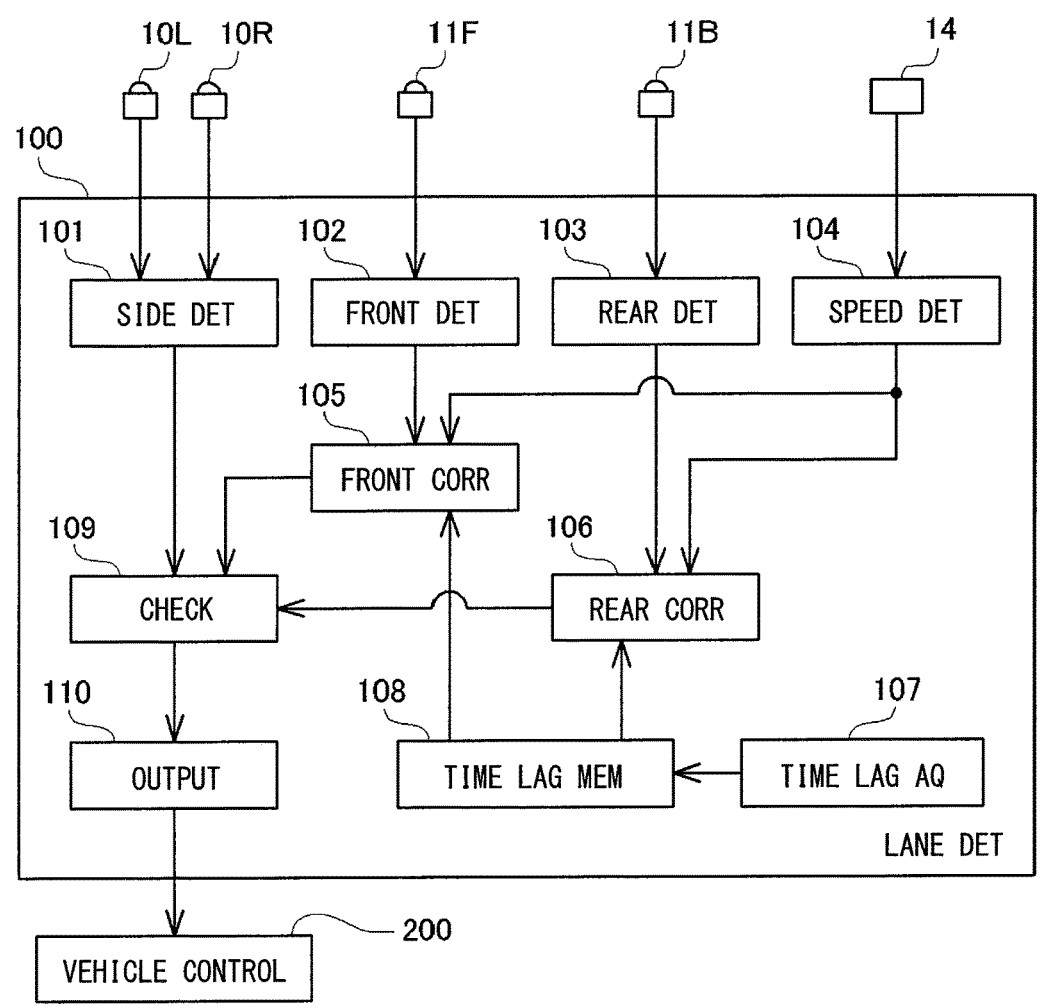
FIG. 2 is a view schematically illustrating an internal configuration of the lane detection apparatus.

FIG. 2 schematically illustrates an internal configuration of the lane detection apparatus 100 of the present embodiment. As illustrated in FIG. 2, the lane detection apparatus 100 of the present embodiment includes a side detection portion 101, a front detection portion 102, a rear detection portion 103, a traveling speed detection portion 104, a front correction portion 105, a rear correction portion 106, a time lag acquisition portion 107, a time lag memory portion 108, a checkup portion 109, and an output portion 110.

Incidentally, these ten "portions" in this context are only abstractions provided in the interior of the lane detection apparatus 100, and classified in view of functions of the lane detection apparatus 100 for analyzing images captured by the left side camera 10L, the right side camera 10R, the front camera 11F, and the rear camera 11B during detection of a lane. It should not be understood that the lane detection apparatus 100 is physically sectioned into ten portions. Accordingly, these "portions" may be realized as a computer program executed by a CPU, an electronic circuit including an LSI and a memory, or a combination of these program and electronic circuit.

The side detection portion 101 acquires an image of the left side of the vehicle 1 from the left side camera 10L, and an image of the right side of the vehicle 1 from the right side camera 10R. The side detection portion 101 analyzes the captured image of the left side of the vehicle 1 to detect a lane division such as a white line or the like (hereinafter referred to as a lane division) existing on the left side of the vehicle 1. The side detection portion 101 analyzes the captured image of the right side of the vehicle 1 to detect a lane division existing on the right side of the vehicle 1.

The lane division detected on the left side or the right side of the vehicle 1 corresponds to a side lane division of the present disclosure.

The front detection portion 102 acquires an image of the front of the vehicle 1 from the front camera 11F, and analyzes the acquired image to detect a lane division existing in front of the vehicle 1.

The rear detection portion 103 acquires an image of the rear of the vehicle 1 from the rear camera 11B, and analyzes the acquired image to detect a lane division existing in the rear of the vehicle 1.

The lane division detected in front of the vehicle 1 corresponds to a front lane division. The lane division detected in the rear of the vehicle 1 corresponds to a rear lane division.

The time lag acquisition portion 107 acquires information on time lags of imaging timing between the left side camera 10L, the right side camera 10R, the front camera 11F, and the rear camera 11B at a start of the respective cameras. The acquired information on the time lags is stored in the time lag memory portion 108.

The traveling speed detection portion 104 acquires, from the vehicle speed sensor 14, a traveling speed of the vehicle 1 at the time of imaging by the left side camera 10L, the right side camera 10R, the front camera 11F, and the rear camera 11B. To be precise, each of the left side camera 10L, the right side camera 10R, the front camera 11F, and the rear camera 11B captures an image at different timing. However, based on consideration that the traveling speed of the vehicle 1 does not greatly changes during the time lags of imaging timing between the cameras, the traveling speed detection portion 104 acquires the traveling speed at the imaging timing of any one of the cameras from the vehicle speed sensor 14.

The front correction portion 105 corrects the position of the lane division (such as white line) detected by the front detection portion 102 while considering the time lag of imaging timing of the front camera 11F from imaging timing of the left side camera 10L, or considering the time lag of imaging timing of the front camera 11F from imaging timing of the right side camera 10R.

For correcting the time lag of imaging timing of the front camera 11F from imaging timing the left side camera 10L, information on the time lag between the left side camera 10L and the front camera 11F is read from the time lag memory portion 108, and corrected in consideration of the traveling speed detected by the traveling speed detection portion 104. For correcting the time lag of imaging timing of the front camera 11F from imaging timing the right side camera 10R, information on the time lag between the right side camera 10R and the front camera 11F is read from the time lag memory portion 108, and corrected in consideration of the traveling speed detected by the traveling speed detection portion 104.

The rear correction portion 106 corrects the position of the lane division detected by the rear detection portion 103 while considering the time lag of imaging timing of the rear camera 11B from imaging timing of the left side camera 10L, or considering the time lag of imaging timing of the rear camera 11B from imaging timing the right side camera 10R.

For correcting the time lag of imaging timing of the rear camera 11B from imaging timing the left side camera 10L, information on the time lag between the left side camera 10L and the rear camera 11B is read from the time lag memory portion 108, and corrected in consideration of the traveling speed detected by the traveling speed detection portion 104. For correcting the time lag of imaging timing of the rear camera 11B from imaging timing the right side camera 10R, information on the time lag between the right side camera 10R and the rear camera 11B is read from the time lag memory portion 108, and corrected in consideration of the traveling speed detected by the traveling speed detection portion 104.

The front correction portion 105 and the rear correction portion 106 of the present embodiment correspond to a position correction portion.

The checkup portion 109 compares the position of the lane division detected by the side detection portion 101, the position of the lane division corrected by the front correction portion 105, and the position of the lane division corrected by the rear correction portion 106, so that the checkup portion 109 determines whether these positions of the lane divisions are matched with each other.

When it is determined that the positions of the lane divisions are alignment each other, the position of the lane division detected by the side detection portion 101 is output to the vehicle control apparatus 200 as a lane detection result.

(Basic Principle to Detect Side Lane Division of Vehicle 1)

Figure 3:
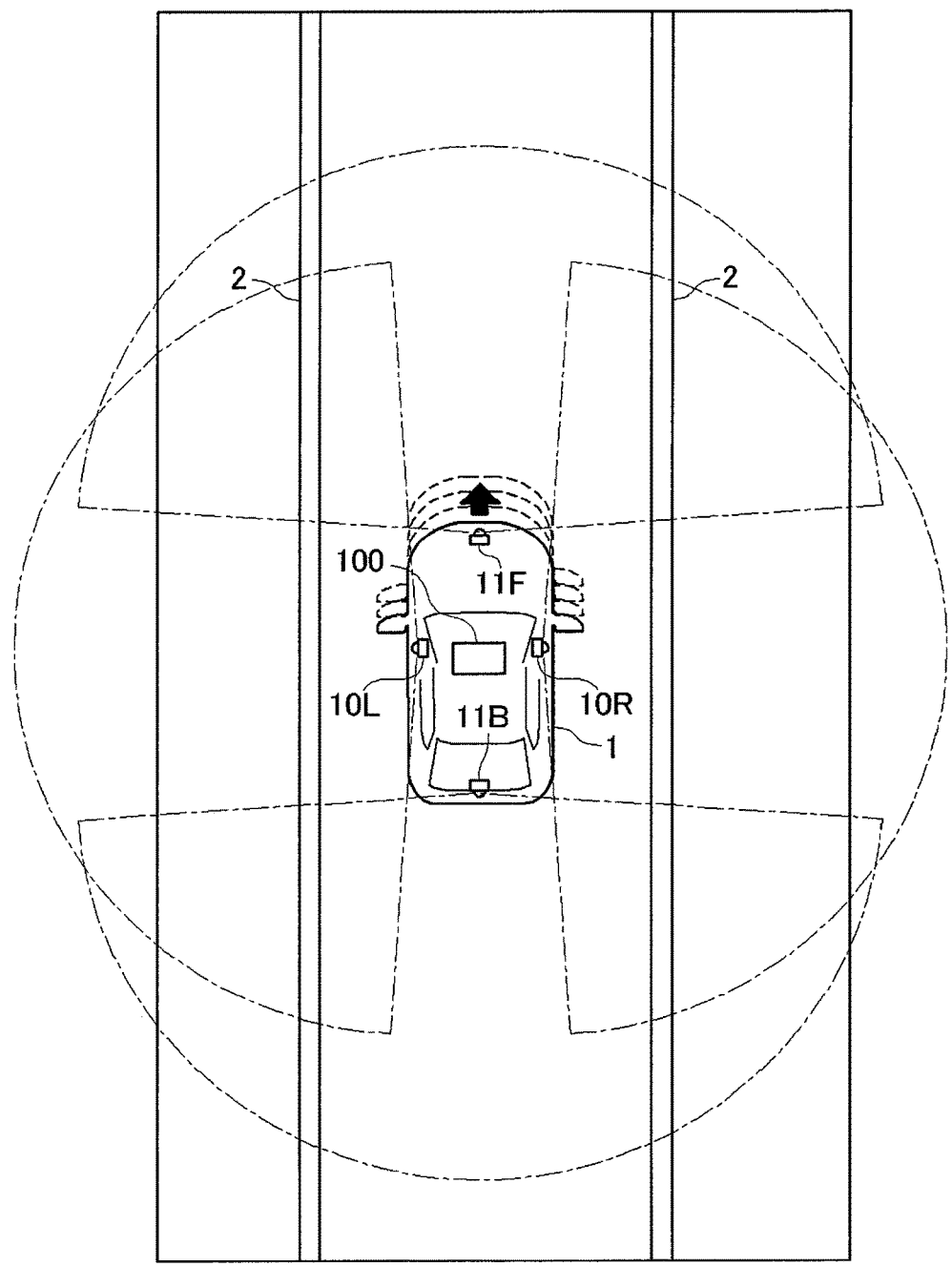
FIG. 3 is a view illustrating imaging of an area around a traveling vehicle by using four vehicle onboard cameras.

FIG. 3 illustrates an example of the vehicle equipped with the foregoing lane detection apparatus 100 in a state of traveling along a lane divided by lane divisions (the white lines 2 in this example). Each of the front camera 11F, the rear camera 11B, the left side camera 10L, and the right side camera 10R includes a wide-angle lens such as a so-called fish-eye lens. The front camera 11F images an area around the front of the vehicle 1, while the rear camera 11B images an area around the rear of the vehicle 1. Similarly, the left side camera 10L images an area around the left side of the vehicle 1, while the right side camera 10R images an area around the right side of the vehicle 1.

Accordingly, the white lines 2 on the front, rear, left side, and right side of the vehicle 1 are detectable based on analysis of images captured by the four vehicle onboard cameras.

Figure 4A:
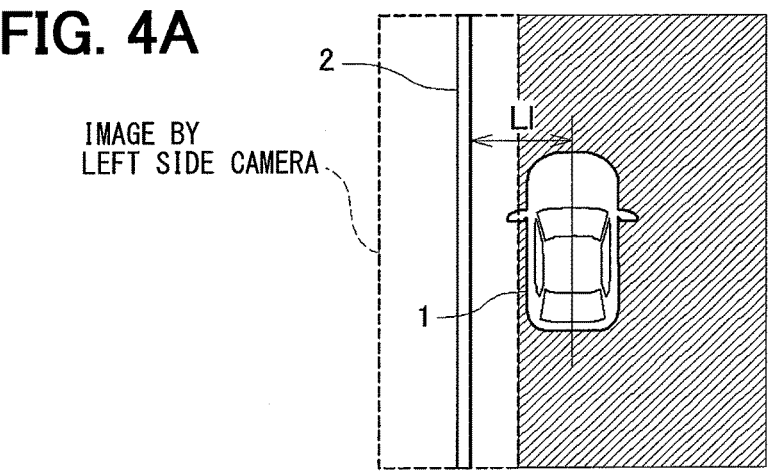
FIG. 4A is a view illustrating an example of an image captured by a left side camera.
Figure 4B:
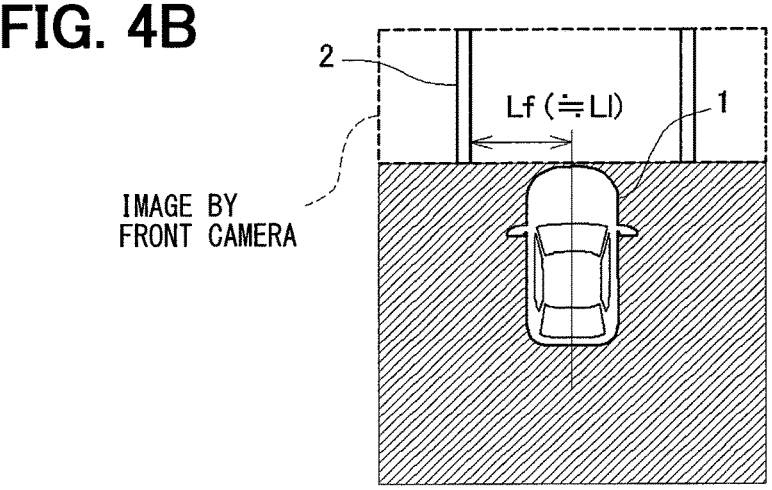
FIG. 4B is a view illustrating an example of an image captured by a front camera.
Figure 4C:
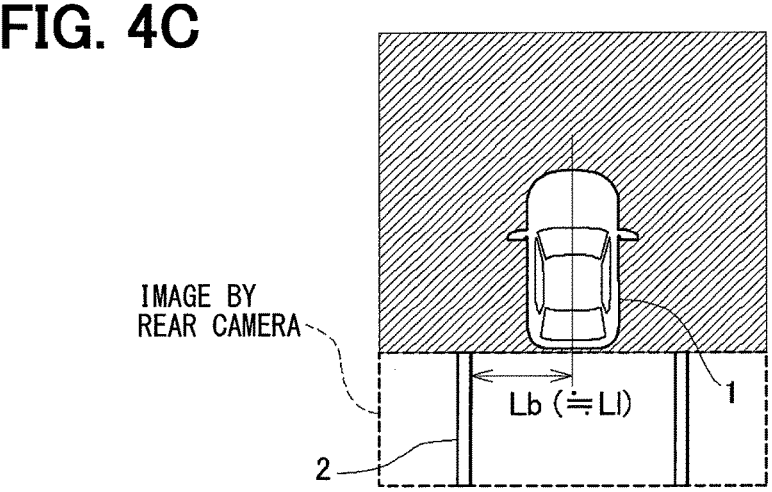
FIG. 4C is a view illustrating an example of an image captured by a rear camera.

FIG. 4A illustrates an example of an image captured by the left side camera 10L. FIG. 4B illustrates an example of an image captured by the front camera 11F. FIG. 4C illustrates an example of an image captured by the rear camera 11B. FIGS. 4A to 4C illustrate a comparison between the position of the lane division (the white line 2) detected by the left side camera 10L, and the positions of the lane divisions (the white line 2) detected by the front camera 11F and the rear camera 11B.

A front part of the white line 2 captured by the left side camera 10L is also contained in the image captured by the front camera 11F, while a rear part of the same white line 2 captured by the left side camera 10L is also contained in the image captured by the rear camera 11B. It is assumed in this condition that the positions detected from the respective images captured by the left side camera 10L, the front camera 11F, and the rear camera 11B as positions of the white lines 2 with respect to the vehicle 1 are matched with each other within a tolerance. The same is applicable to the images of the right side camera 10R, the front camera 11F, and the rear camera 11B.

It is therefore confirmable whether the detection result of the white line 2 detected on the side of the vehicle 1 based on the images captured by the left side camera 10L and the right side camera 10R is valid by referring to the detection result of the white line 2 obtained based on the image captured by the front camera 11F or the rear camera 11B.

More specifically, it is supposed that the distance between the vehicle 1 and the left white line 2 is detected as a distance L1 based on the image captured by the left side camera 10L as illustrated in FIG. 4A. Also, it is supposed that the distance between the vehicle 1 and the left white line 2 is detected as a distance Lf by the front camera 11F (refer to FIG. 4B), and as a distance Lb by the rear camera 11B (refer to FIG. 4C).

In this case, when the distance Lf detected by the front camera 11F or the distance Lb detected by the rear camera 11B agrees with the distance L1 detected by the left side camera 10L within a tolerance, it is determined that the white line 2 on the left side of the vehicle 1 has been correctly detected. The same is applicable to the white line 2 on the right side of the vehicle 1.

Accordingly, the lane detection apparatus 100 of the present embodiment illustrated in FIG. 2 is capable of detecting the white line 2 with sufficient reliability based on the images captured by the left side camera 10L and the right side camera 10R, while avoiding false detection.

Discussed above has been an ideal situation on the assumption that the four vehicle onboard cameras (the left side camera 10L, the right side camera 10R, the front camera 11F, and the rear camera 11B) capture images at the same timing (or with a slight time lag recognized as substantially equivalent timing). However, the four vehicle onboard cameras do not necessarily capture image at the same timing. In addition, the vehicle 1 continues traveling while the four vehicle onboard cameras are capturing images.

Accordingly, in an actual situation, the positions at which the four vehicle onboard cameras (the left side camera 10L, the right side camera 10R, the front camera 11F, and the rear camera 11B) capture images are slightly different as indicated by broken lines in FIG. 3.

When the vehicle 1 travels at a relatively low speed, or travels along the lane, images substantially equivalent to the images illustrated in FIGS. 4A to 4C are captured by the vehicle onboard cameras located at positions slightly different as indicated by the broken lines in FIG. 3. In this case, the foregoing description is applicable even when imaging timing is different for each of the vehicle onboard cameras. Accordingly, the white line 2 is detectable with sufficient reliability based on the images captured by the left side camera 10L and the right side camera 10R.

However, when the vehicle 1 changes the lane during high-speed traveling, for example, an influence may be produced by different imaging timing for each of the vehicle onboard cameras.

Figure 5:
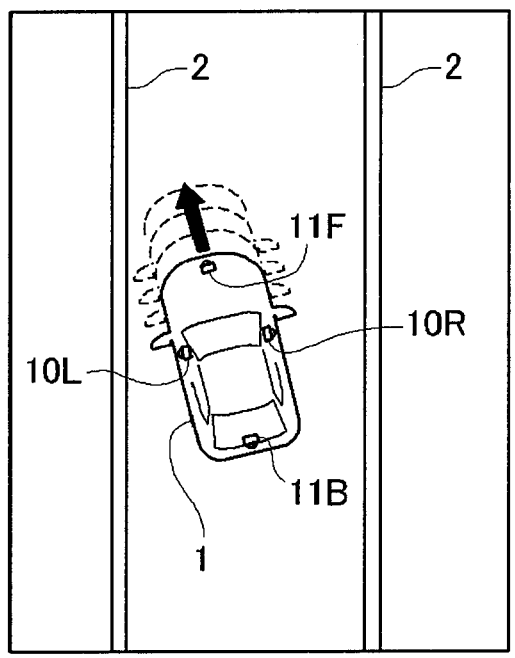
FIG. 5 is a view of imaging of an area around the vehicle at the time of a lane change of the vehicle traveling at high speed.

FIG. 5 illustrates an example of differences in the position of imaging between the vehicle onboard cameras produced when the vehicle 1 changes the lane during high-speed traveling.

For example, it is supposed that the four vehicle onboard cameras (the left side camera 10L, the right side camera 10R, the front camera 11F, and the rear camera 11B) mounted on the vehicle 1 capture images in the order of the front camera 11F, the rear camera 11B, the left side camera 10L, and the right side camera 10R, for example. In FIG. 5, the position of the vehicle 1 at the time of imaging by the front camera 11F is indicated by a solid line, while each of the positions of the vehicle 1 at the time of imaging by the rear camera 11B, the left side camera 10L, and the right side camera 10R after imaging by the front camera 11F is indicated by a fine broken line.

Figure 6A:
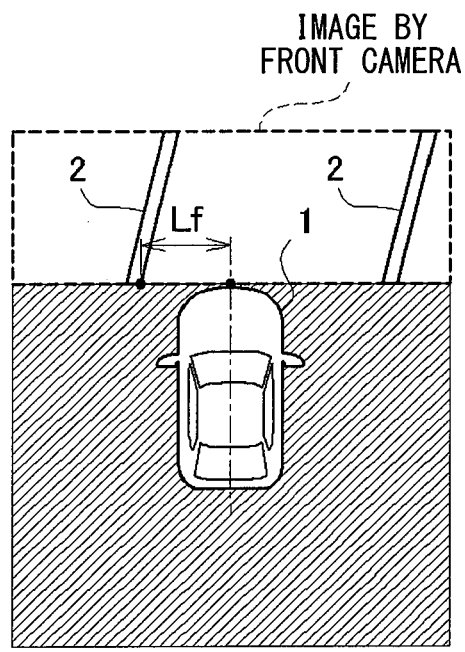
FIG. 6A is a view illustrating an example of an image captured by the front camera.
Figure 6B:
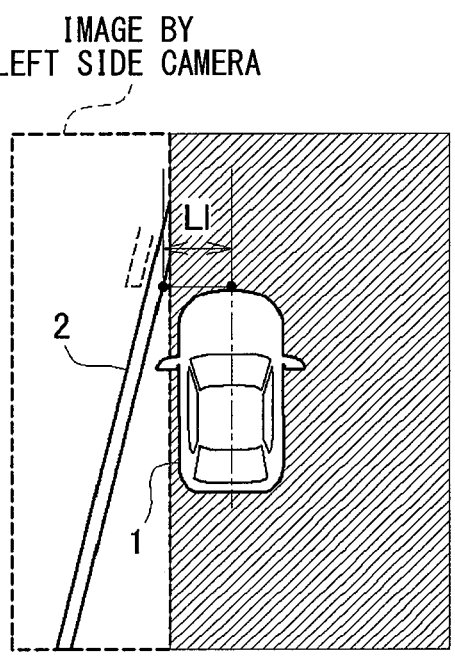
FIG. 6B is a view illustrating an example of an image captured by the left side camera.

FIG. 6A illustrates an image captured by the front camera 11F (an image captured at the position of the vehicle 1 indicated by the solid line in FIG. 5), while FIG. 6B illustrates an image captured by the left side camera 10L. FIG. 6A and FIG. 6B illustrate a difficulty which may be caused when imaging timing is different for each of the vehicle onboard cameras at the time of a lane change in a high-speed traveling condition. When the vehicle 1 travels obliquely toward the white line 2 at a high speed as described with reference to FIG. 5, the vehicle 1 comes considerably close to the white line 2 during a period from the time of imaging by the front camera 11F to the time of imaging by the left side camera 10L. In this case, the position of the white line 2 located on the left side of the vehicle 1 and detected based on the image captured by the front camera 11F is not matched with the position of the corresponding white line 2 detected based on the image captured by the left side camera 10L. In FIG. 6A and FIG. 6B, the distance between the vehicle 1 and the white line 2 is indicated as a distance measured in the left direction from the head of the vehicle 1. In FIG. 6B, the left white line 2 detected in FIG. 6A is indicated by a fine broken line.

Accordingly, it may become difficult to confirm whether the detection result of the white line 2 on the side of the vehicle 1 is valid based on the detection result of the white line 2 obtained in front of or in the rear of the vehicle 1 when the vehicle 1 changes the lane during high-speed traveling as illustrated in FIG. 5.

For overcoming this difficulty, the lane detection apparatus 100 of the present embodiment confirms validity of the detection result of the white line 2 on the side of the vehicle 1 in the following manner to detect the lane with sufficient reliability even at the time of a lane change in the high-speed traveling condition of the vehicle 1.

(Lane Detection Process)

Figure 7:
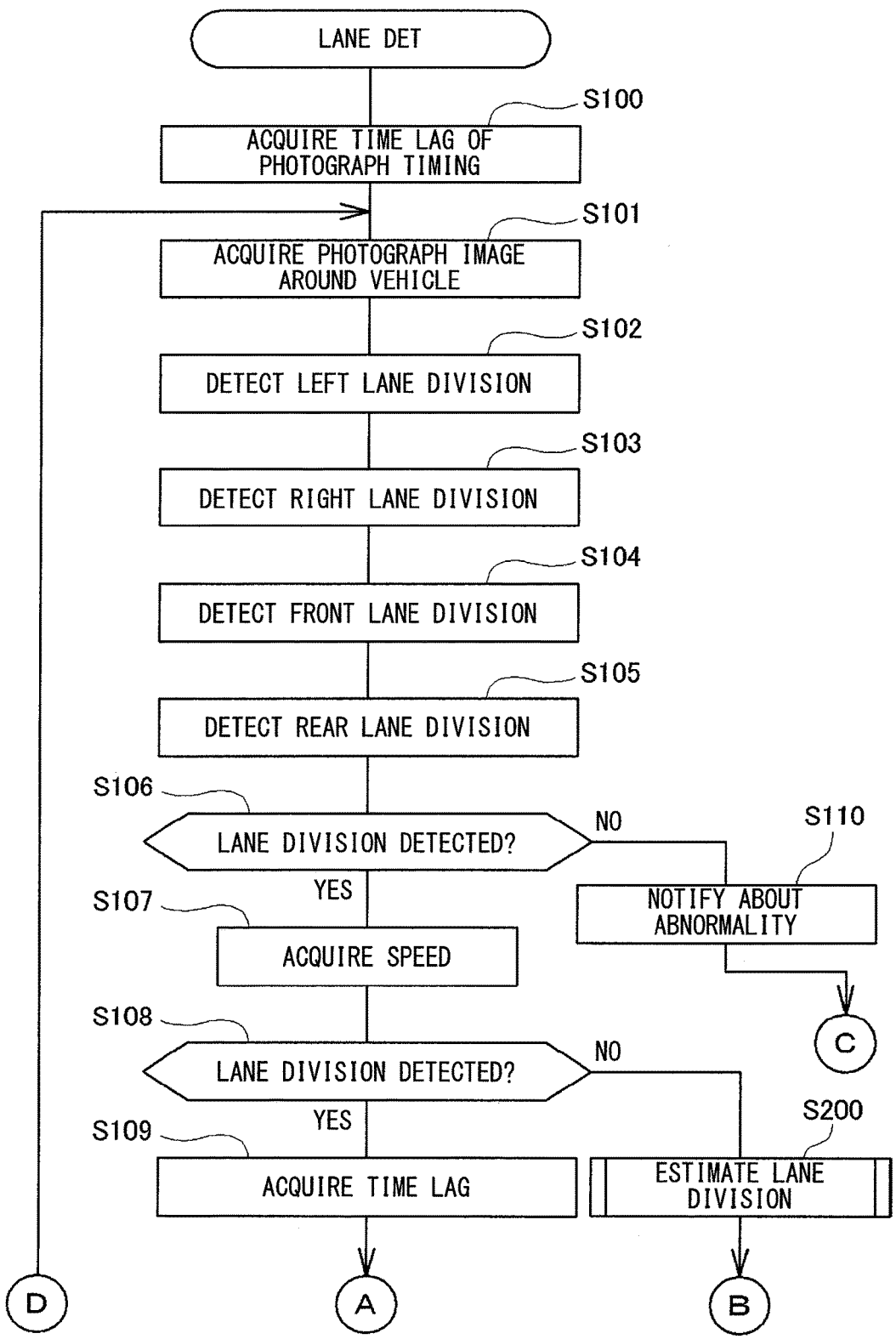
FIG. 7 is a flowchart showing a first half of a lane detection process.
Figure 8:
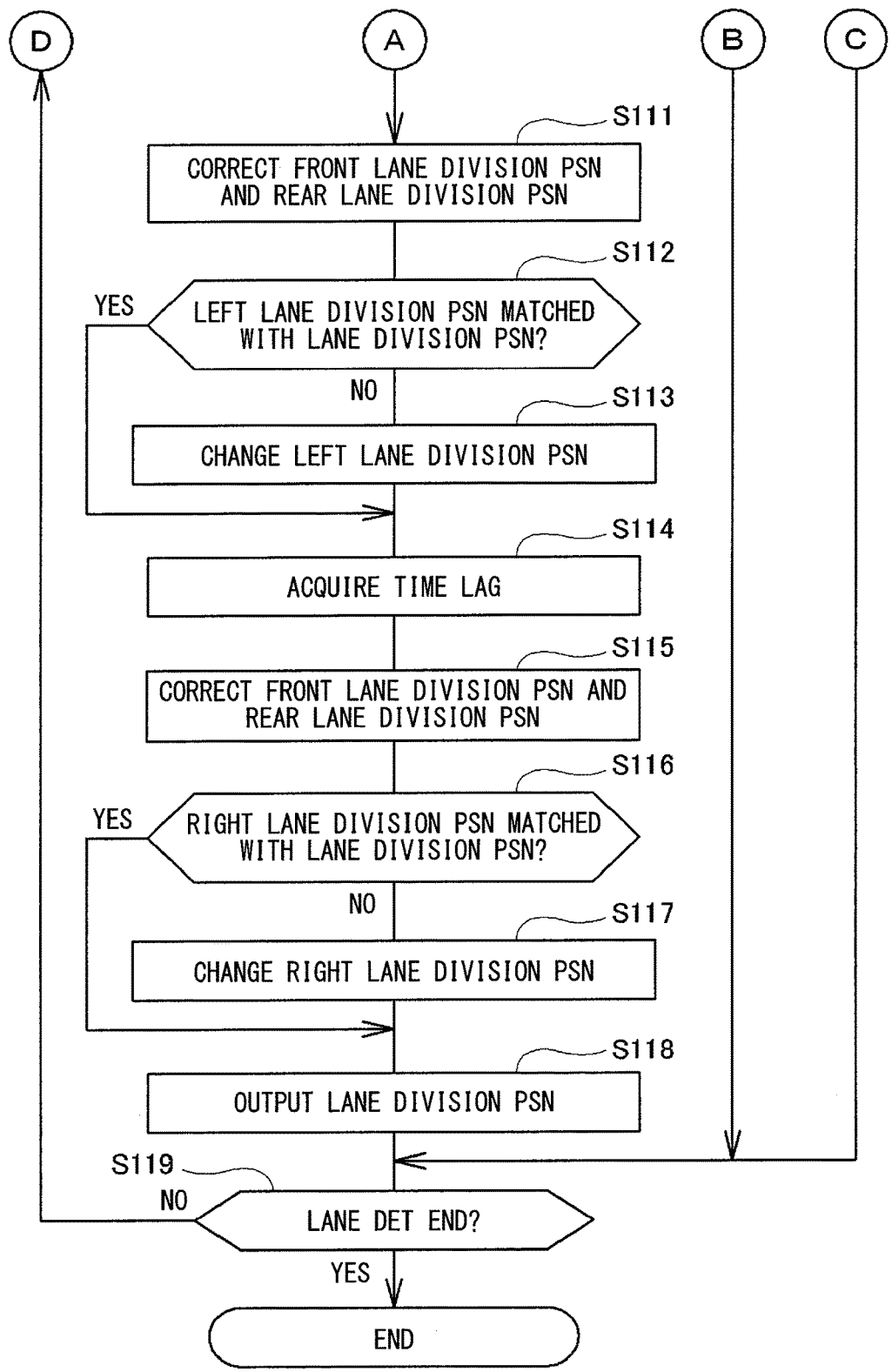
FIG. 8 is a flowchart showing a second half of the lane detection process.

FIG. 7 and FIG. 8 are flowcharts of a lane detection process performed by the lane detection apparatus 100 of the present embodiment.

As illustrated in the figures, the lane detection apparatus 100 initially starts the four vehicle onboard cameras (the left side camera 10L, the right side camera 10R, the front camera 11F, and the rear camera 11B) in response to a start of the lane detection process. Thereafter, the lane detection apparatus 100 acquires time lags of imaging timing between the respective vehicle onboard cameras (S100). More specifically, each of the left side camera 10L, the right side camera 10R, the front camera 11F, and the rear camera 11B captures an image in a fixed imaging cycle after the start, and outputs the captured image to the lane detection apparatus 100. In this case, a uniform imaging cycle is set for the respective vehicle onboard cameras. However, the respective vehicle onboard cameras are not necessarily started at completely identical timing. Accordingly, each of the left side camera 10L, the right side camera 10R, the front camera 11F, and the rear camera 11B continuously produces a phase difference determined at the start between each other during cyclical imaging.

Figure 9:
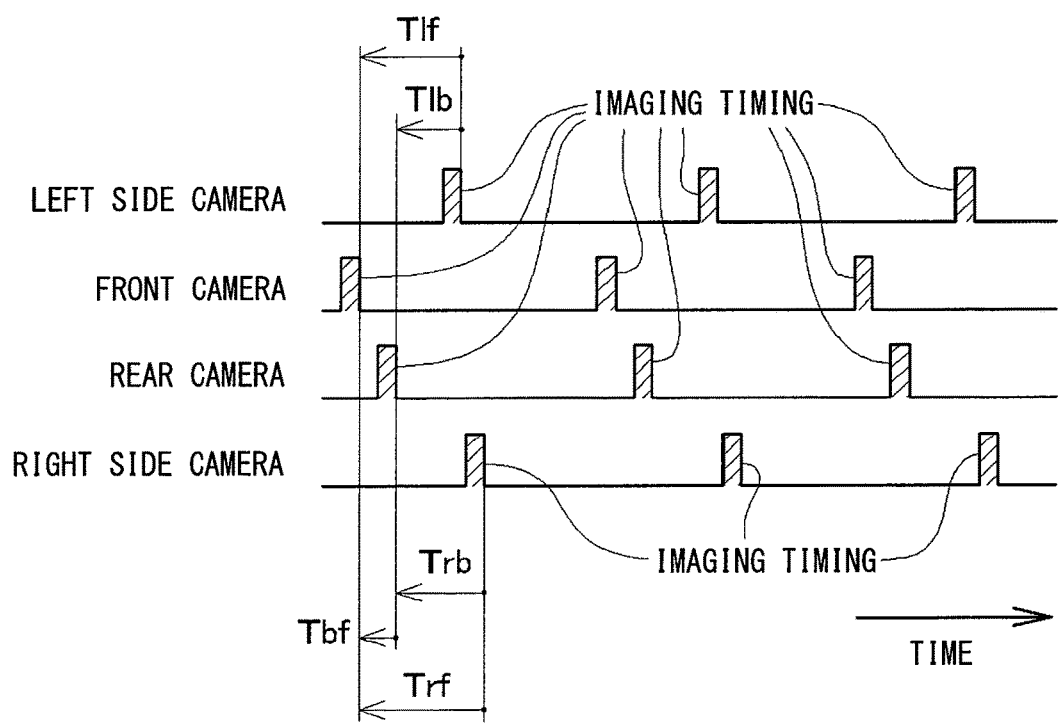
FIG. 9 is a view illustrating an example of differences in imaging timings between the left side camera, a right side camera, the front camera, and the rear camera.

FIG. 9 illustrates a state of imaging by the left side camera 10L, the front camera 11F, the rear camera 11B, and the right side camera 10R in the same imaging cycle while producing a fixed phase difference between each other.

The lane detection apparatus 100 of the present embodiment acquires a time lag Tlf of imaging timing of the front camera 11F from imaging timing of the left side camera 10L, and a time lag Tlb of imaging timing of the rear camera 11B from imaging timing of the left side camera 10L after the start of the four vehicle onboard cameras in response to the start of the lane detection process illustrated in FIG. 7. In addition, the lane detection apparatus 100 acquires a time lag Trf of imaging timing of the front camera 11F from imaging timing of the right side camera 10R, and a time lag Trb of imaging timing of the rear camera 11B from imaging timing of the right side camera 10R. Furthermore, the lane detection apparatus 100 acquires a time lag Tbf of imaging timing of the front camera 11F from imaging timing of the rear camera 11B. The respective time lags thus acquired are stored in the time lag memory portion 108 illustrated in FIG. 2.

Subsequently, the lane detection apparatus 100 acquires an image of an area around the left side of the vehicle 1 from the left side camera 10L, an image of an area around the right side of the vehicle 1 from the right side camera 10R, an image of an area around the front of the vehicle 1 from the front camera 11F, and an image of an area around the rear of the vehicle 1 from the rear camera 11B (S101).

The lane detection apparatus 100 analyzes the image captured by the left side camera 10L to detect the lane division (white line 2 in this example) on the left side of the vehicle 1 (S102), and analyzes the image captured by the right side camera 10R to detect the lane division (the white line 2) on the right side of the vehicle 1 (S103).

Similarly, the lane detection apparatus 100 detects the lane division (the white line 2) in front of the vehicle 1 based on the image captured by the front camera 11F (S104), and detects the lane division (the white line 2) in the rear of the vehicle 1 based on the image captured by the rear camera 11B (S105).

Figure 10A:
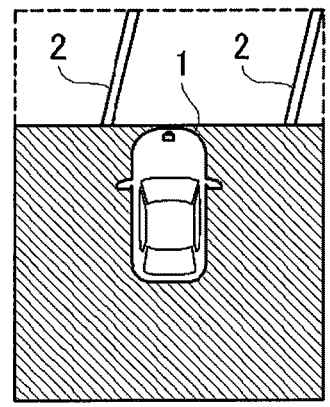
FIG. 10A is a view illustrating detection of a position of a lane division in a front area of the vehicle.
Figure 10B:
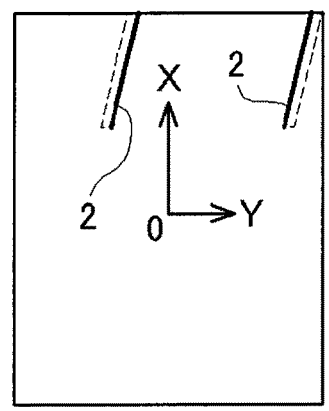
FIG. 10B is a view illustrating detection of the position of the lane division in the front area of the vehicle.

Each of FIG. 10A and FIG. 10B illustrates a state of detection of the white line 2 in front of the vehicle 1 based on the image captured by the front camera 11F. As illustrated in FIG. 10A and FIG. 10B, the position of the white line 2 is detected as an equation expressing a line in an X-Y coordinate system with an origin located at the position of the vehicle 1.

Figure 10C:
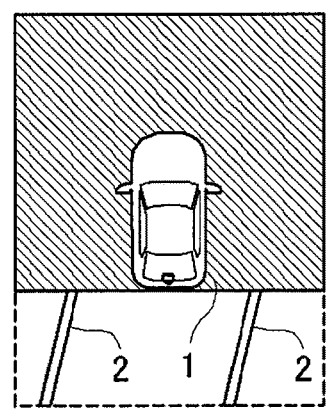
FIG. 10C is a view illustrating detection of a position of a lane division in a rear area of the vehicle.
Figure 10D:
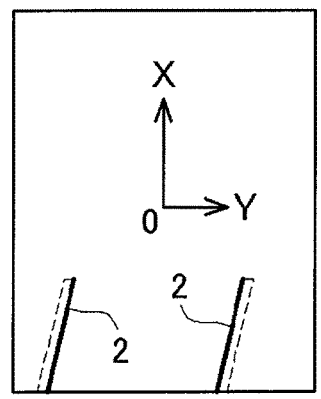
FIG. 10D is a view illustrating detection of the position of the lane division in the rear area of the vehicle.
Figure 10E:
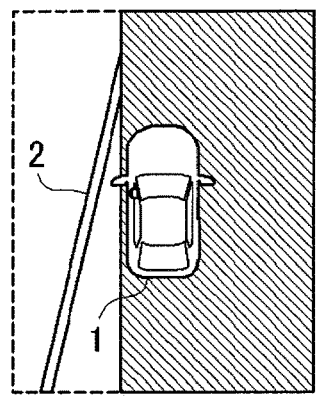
FIG. 10E is a view illustrating detection of a position of a lane division in a left side area of the vehicle.
Figure 10F:
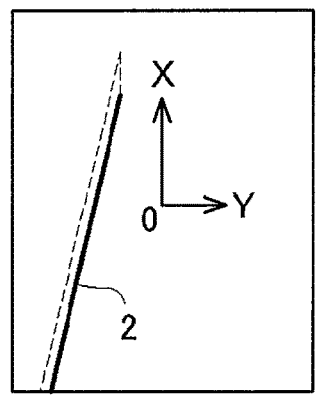
FIG. 10F is a view illustrating detection of the position of the lane division in the left side area of the vehicle.
Figure 10G:
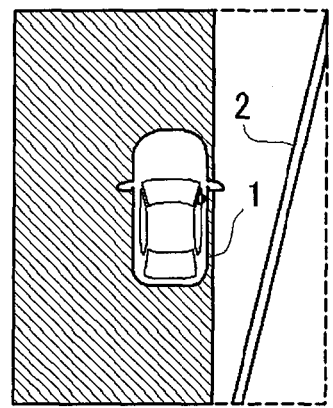
FIG. 10G is a view illustrating detection of a position of a lane division in a right side area of the vehicle.
Figure 10H:
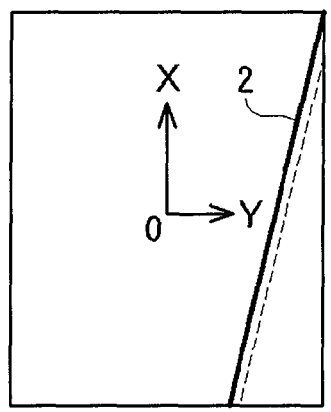
FIG. 10H is a view illustrating detection of the position of the lane division in the right side area of the vehicle.

Each of FIG. 10C and FIG. 10D illustrates a state of detection of the white line 2 in the rear of the vehicle 1 based on the image captured by the rear camera 11B. Each of FIG. 10E and FIG. 10F illustrates a state of detection of the white line 2 on the left side of the vehicle 1 based on the image captured by the left side camera 10L. Each of FIG. 10G and FIG. 10H illustrates a state of detection of the white line 2 on the right side of the vehicle 1 based on the image captured by the right side camera 10R. Each of the white lines 2 illustrated in these figures is detected as an equation expressing a line in the X-Y coordinate system.

After detection of the white line 2, the lane detection apparatus 100 determines whether the lane division (the white line 2 in this example) has been detected in each of the front and the rear of the vehicle 1 (S106 in FIG. 7). In general, the white line 2 or other types of lane divisions are detectable in each of the front and rear of the vehicle 1 during traveling of the vehicle 1 along the lane. Accordingly, it is estimated that any abnormal condition has occurred when no lane division is detected in each of the front and rear of the vehicle 1.

When no lane division is detected in each of the front and rear of the vehicle 1 (S106: no), notification about the abnormal condition is issued with an alarm sound output from a not-shown speaker, or lighting of a not-shown lamp (S110).

When a lane division is detected in each of the front and rear of the vehicle 1 (S106: yes), the traveling speed of the vehicle 1 is acquired from the vehicle speed sensor 14 (S107). The traveling speed may be acquired at the time of acquisition of the images from the vehicle onboard cameras in S101.

After acquisition of the vehicle speed, the lane detection apparatus 100 determines whether the lane division (the white line 2 in this example) has been detected on each of the left side and the right side of the vehicle 1 (S108).

When it is determined that the lane division has been detected on each of the left side and the right side of the vehicle 1 (S108: yes), the time lag Tlf of imaging timing of the front camera 11F from imaging timing of the left side camera 10L (refer to FIG. 9), and the time lag Tlb of imaging timing of the rear camera 11B from imaging timing of the left side camera 10L (refer to FIG. 9) are acquired (S109). These time lags have been acquired beforehand in S100 and have been stored in the time lag memory portion 108 (refer to FIG. 2) at the start of the lane detection process.

Thereafter, the position of the lane division (the white line 2) detected in each of the front and the rear of the vehicle 1 is corrected (S111 in FIG. 8) based on the traveling speed of the vehicle 1 acquired in S107, and the time lags acquired in S109.

Figure 11A:
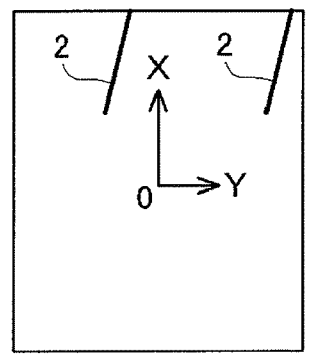
FIG. 11A is a view illustrating a state before correction of the position of the lane division detected in the front area.
Figure 11B:
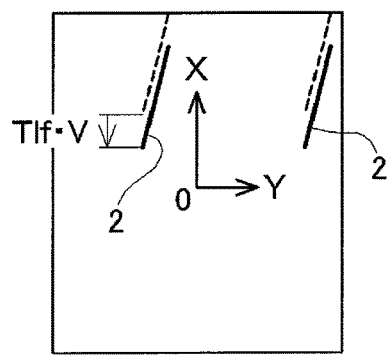
FIG. 11B is a view illustrating a state after correction of the position of the lane division detected in the front area.

Each of FIG. 11A and FIG. 11B illustrates correction of the position of the lane division (the white line 2) detected in front of the vehicle 1. The position of the lane division (the white line 2) detected in front of the vehicle 1 is acquired at timing earlier than the timing of detection of the position of the lane division (the white line 2) on the left side of the vehicle 1 by the time lag Tlf. During the period of this time lag, the vehicle 1 moves in a direction to come closer to the white line 2 by a distance (traveling speed V)×(time lag Tlf). Accordingly, the position of the lane division (the white line 2) in front of the vehicle 1 illustrated in FIG. 11A is shifted in the direction opposite to the traveling direction of the vehicle 1 by the distance (traveling speed V)×(time lag Tlf) to correct the position to a position illustrated in FIG. 11B.

The position of the lane division (the white line 2) detected in the rear of the vehicle 1 is corrected in a similar manner. More specifically, the position of the lane division (the white line 2) detected in the rear of the vehicle 1 is acquired at earlier timing than the timing of detection of the position of the lane division (the white line 2) on the left side of the vehicle 1 by the time lag Tlb. Accordingly, the position of the lane division (the white line 2) in the rear of the vehicle 1 is shifted in the traveling direction of the vehicle 1 by a distance (traveling speed V)×(time lag Tlb).

Subsequently, the lane detection apparatus 100 determines whether the position of the lane division (the white line 2) detected on the left side of the vehicle 1 is matched with the corrected position of the lane division (the white line 2) in each of the front and the rear of the vehicle 1 (S112 in FIG. 8).

As described with reference to FIGS. 10A to 10H, each of the position of the lane division (the white line 2) on the left side of the vehicle 1 and the positions of the lane divisions (white lines 2) in front of and in the rear of the vehicle 1 is detected as an equation expressing a line in the X-Y coordinate system. Furthermore, the position of the lane division (the white line 2) in each of the front and the rear of the vehicle 1 is corrected such that the corresponding line is shifted in the X direction in the X-Y coordinate system. Accordingly, these lines are only compared in the X-Y coordinate system to determine whether the respective lines are matched (i.e., matched within tolerance).

When it is determined that the detected positions of the lane divisions (white lines 2) are matched at three points on the left side, in front, and in the rear of the vehicle 1 (S112: yes), this condition of alignment is recognized as a state that the lane division (the white line 2) on the left side has been correctly detected. Subsequently, similar operation is initiated for the lane division (the white line 2) on the right side.

When it is determined that the detected positions of the lane divisions (white lines 2) are not matched at three points on the left side, in front, and in the rear of the vehicle 1 (S112: no), this condition of non-alignment is considered most likely to come from false detection of the lane division (the white line 2) on the left side. Accordingly, the position of the lane division (the white line 2) on the left side is switched to a position estimated based on the position of the lane division (the white line 2) on the left side of the vehicle 1 detected in a previous process (S113).

According to the present embodiment, the position of the lane division (the white line 2) detected on the left side of the vehicle 1 is compared with the position of the lane division (the white line 2) detected in front of the vehicle 1, and further with the position of the lane division (the white line 2) detected in the rear of the vehicle 1. In a more simplified method, however, alignment may be confirmed by a comparison between the position of the lane division (the white line 2) on the left side of the vehicle 1 and the position of the lane division (the white line 2) either in front of or in the rear of the vehicle 1. In this case, a processing load imposed on the lane detection apparatus 100 decreases.

However, when the position of the lane division (the white line 2) on the left side of the vehicle 1 is compared with both the positions of the lane divisions (white lines 2) in front of and in the rear of the vehicle 1 as in the present embodiment, false detection is securely eliminated by double checking.

When the process for the lane division (the white line 2) on the left side is completed in the foregoing manner, a similar process is initiated for the lane division (the white line 2) on the right side. More specifically, the time lag Trf of imaging timing of the front camera 11F from imaging timing of the right side camera 10R (refer to FIG. 9), and the time lag Trb of imaging timing of the rear camera 11B from imaging timing of the right side camera 10R (refer to FIG. 9) are acquired (S114)

After acquisition of the time lags, each of the positions of the lane divisions (white lines 2) detected in front of and in the rear of the vehicle 1 is corrected (S115). For correction, the position of the lane division (the white line 2) detected in front of the vehicle 1 is shifted in the direction opposite to the traveling direction of the vehicle 1 by a distance of (a traveling speed V)×(a time lag Trf). On the other hand, the position of the lane division (the white line 2) detected in the rear of the vehicle 1 is shifted in the traveling direction of the vehicle 1 by the distance of (the traveling speed V)×(the time lag Trb) for correction.

After the correction, it is determined whether the position of the lane division (the white line 2) detected on the right side of the vehicle 1 is matched with the positions of the corrected lane divisions (the white lines 2) in front of and in the rear of the vehicle 1 (S116). The position of the lane division (the white line 2) detected on the right side of the vehicle 1 is detected as an equation expressing a line in the X-Y coordinate system, similarly to the position of the lane division (the white line 2) detected on the left side. Accordingly, alignment of the positions of the lane divisions (the white lines 2) on the right side, in front, and in the rear of the vehicle 1 is easily confirmable.

When it is determined that the respective positions of the lane divisions (white lines 2) are not matched (S116: no), this non-alignment is considered most likely to come from false detection of the lane division (the white line 2) on the right side. Accordingly, the position of the lane division (the white line 2) on the right side is switched to a position estimated based on the lane division (the white line 2) on the right side detected in a previous process (S117).

When it is determined that the positions of the lane divisions (white lines 2) are matched on the right side, in front, and in the rear of the vehicle 1 (S116: yes), this condition of alignment is recognized as a state that that the lane division (the white line 2) on the right side has been correctly detected. Accordingly, the process for switching the position to a position estimated from the previous detection result (S117) is skipped.

Incidentally, alignment of the position of the lane division (the white line 2) detected on the right side of the vehicle 1 may be determined only by a comparison with the position of the lane division (the white line 2) either in front of or in the rear of the vehicle 1.

Thereafter, the position of the lane division (the white line 2) on the left side and the position of the lane division (the white line 2) on the right side both detected by the foregoing process are output to the vehicle control apparatus 200 as a lane detection result (S118).

After the output, it is determined whether to end lane detection (S119). When ending of lane detection is not desired (S119: no), the flow returns to S101 in FIG. 7 to again acquire images from the four vehicle onboard cameras (the left side camera 10L, the right side camera 10R, the front camera 11F, and the rear camera 11B), and starts a series of the foregoing steps.

Discussed above is the process performed when the lane division (the white line 2) in each of the front and the rear of the vehicle 1 is detected (S106: yes in FIG. 7) and when the lane division (the white line 2) is detected on each of the left side and the light side of the vehicle 1 (S108: yes).

Figure 12:
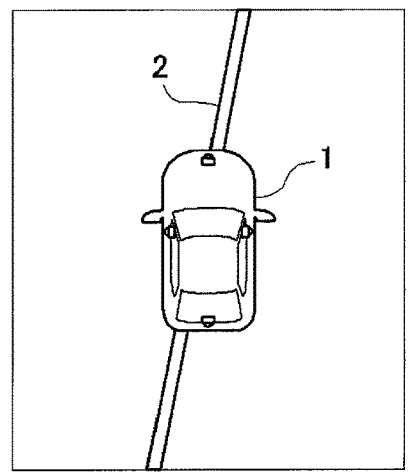
FIG. 12 is a view illustrating an example of a state of the vehicle crossing the lane division.

When no lane division (the white line 2) is detected on each of the left side and the right side (S108: no) of the vehicle 1 in the state that the lane division (the white line 2) has been detected in each of the front and the rear of the vehicle 1 (S106: yes), this condition is recognized as a situation that the vehicle 1 crosses the lane division (the white line 2) as illustrated in FIG. 12.

In this case, the lane detection apparatus 100 initiates a lane division estimation process (S200) described below.

As described with reference to FIGS. 10A to 10H, the one lane division (the white line 2) on the left side of the vehicle 1 and the one lane division (the white line 2) on the right side of the vehicle 1, i.e., the two lane divisions (white lines 2) in total are detected in each of the images captured by the front camera 11F and the rear camera 11B in the normal condition (situation in which the vehicle 1 does not cross the white line 2). In this case, the inside position of each of the two detected lane divisions (white lines 2) is determined as the position of the lane division (the white line 2) in S104 and 105 in FIG. 7 (refer to FIG. 10A, FIG. 10B, FIG. 10C, and FIG. 10D).

Figure 13A:
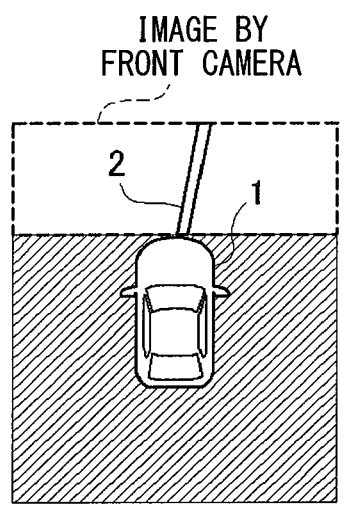
FIG. 13A is a view illustrating an example of detection of the position of the lane division in the front area in the state of the vehicle crossing the lane division.
Figure 13B:
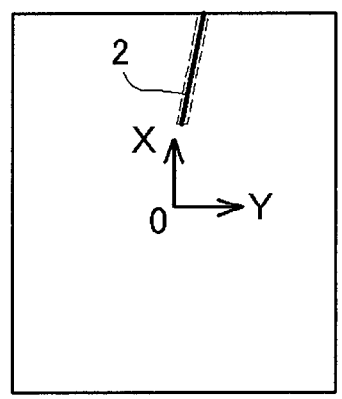
FIG. 13B is a view illustrating an example of detection of the position of the lane division in the front area in the state of the vehicle crossing the lane division.
Figure 13C:
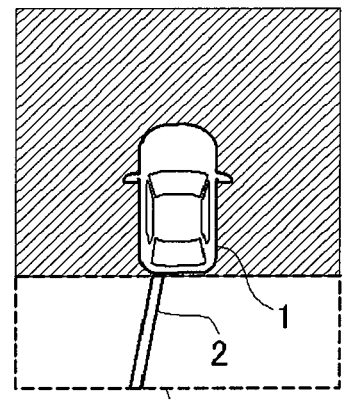
FIG. 13C is a view illustrating an example of detection of the position of the lane division in the rear area in the state of the vehicle crossing the lane division.
Figure 13D:
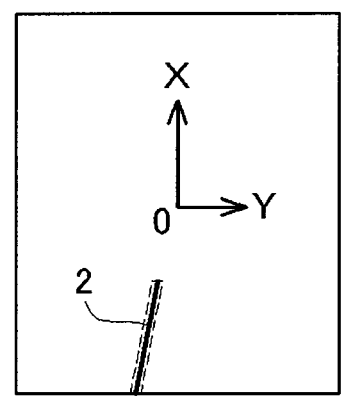
FIG. 13D is a view illustrating an example of detection of the position of the lane division in the rear area in the state of the vehicle crossing the lane division.

However, when the vehicle 1 crosses the lane division (the white line 2) as in an example illustrated in FIG. 12, only the one lane division (the white line 2) is detected in each of the images captured by the front camera 11F and the rear camera 11B. In this case, the position of the center line of the detected lane division (the white line 2) is determined as the position of the lane division (the white line 2). More specifically, the position of the center line of the lane division (the white line 2) in the image captured by the front camera 11F is determined as the position of the lane division (the white line 2) in S104 in FIG. 7 as in an example illustrated in FIG. 13A and FIG. 13B. On the other hand, the position of the center line of the lane division (the white line 2) in the image captured by the rear camera 11B is determined as the position of the lane division (the white line 2) in S105 in FIG. 7 as in an example illustrated in FIG. 13C and FIG. 13D.

Figure 14:
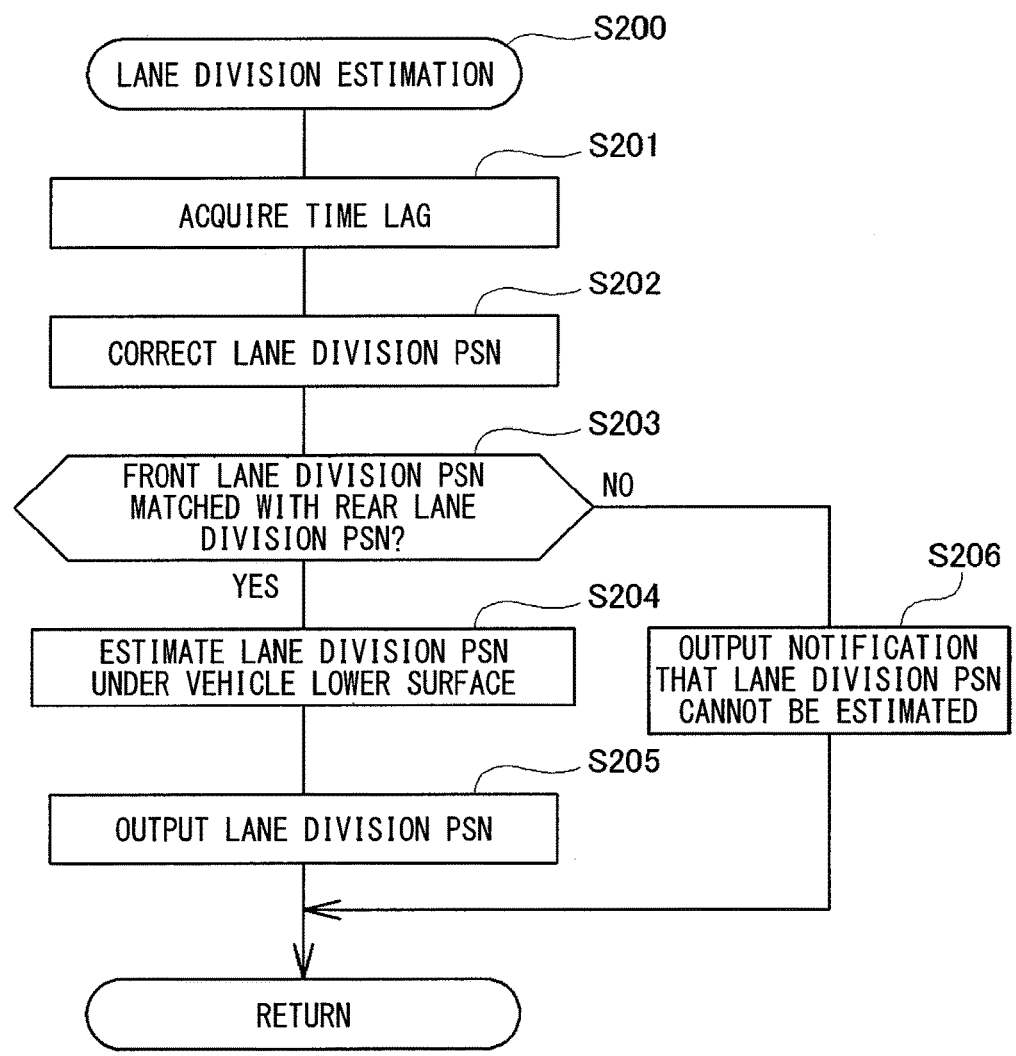
FIG. 14 is a flowchart showing a lane division estimation process.

FIG. 14 is a flowchart showing the lane division estimation process.

As illustrated in FIG. 14, the time lag Tbf of imaging timing of the front camera 11F from imaging timing of the rear camera 11B is initially acquired in the lane division estimation process (S201).

As described with reference to FIG. 9, the time lag Tbf has been acquired at the start of the lane detection process illustrated in FIG. 7 and FIG. 8, and has been stored in the time lag memory portion 108 beforehand.

Figure 15A:
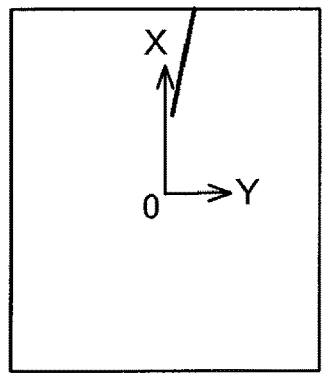
FIG. 15A is a view illustrating a state before correction of the position of the lane division in the lane division estimation process.
Figure 15B:
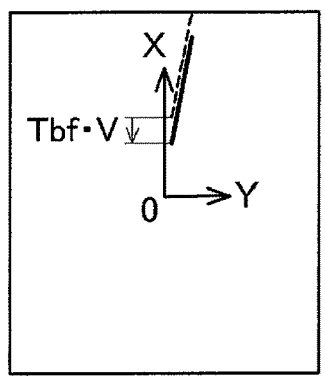
FIG. 15B is a view illustrating a state after correction of the position of the lane division in the lane division estimation process.

After acquisition of the time lag, the position of the lane division (the white line 2) detected in front of the vehicle 1 is corrected based on the traveling speed detected in S107 in FIG. 7, and the time lag Tbf (S202). More specifically, the position of the lane division (the white line 2) detected in front of the vehicle 1 is shifted in the direction opposite to the traveling direction of the vehicle 1 by a distance (traveling speed V)×(time lag Tbf) as in an example illustrated in FIG. 15A and FIG. 15B. This shift corrects the position of the lane division (the white line 2) as in the example illustrated in FIG. 15A to a position of the lane division (the white line 2) as in the example illustrated in FIG. 15B.

After the correction, it is determined whether the corrected position of the lane division (the white line 2) in the front area is matched with the position of the lane division (the white line 2) in the rear area (whether these positions are matched within tolerance) (S203).

Figure 16:
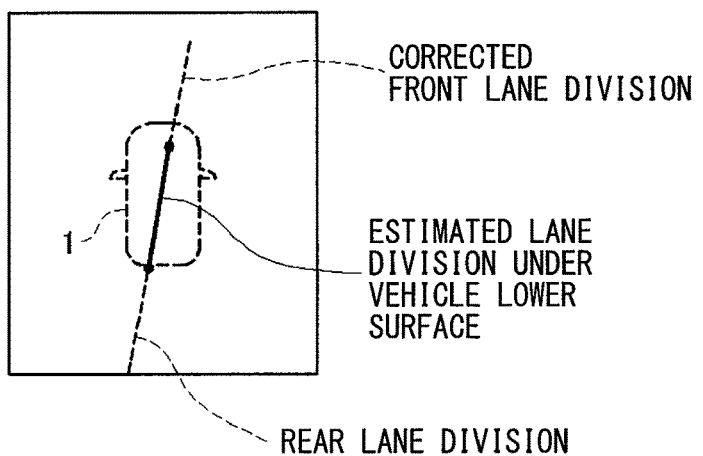
FIG. 16 is a view illustrating estimation of the position of the vehicle division in the state of the vehicle crossing the lane division.

When alignment is confirmed (S203: yes), the position of the lane division (the white line 2) under a lower surface of the vehicle 1 is estimated based on the position of the lane division (the white line 2) detected in the rear of the vehicle 1 and the corrected position of the lane division (the white line 2) in front of the vehicle 1 (S204). The process in S204 corresponds to a lane division estimation section. More specifically, each of the position of the lane division (the white line 2) in the rear of the vehicle 1 and the corrected position of the lane division (the white line 2) in front of the vehicle 1 is expressed as a line in the X-Y coordinate system. Therefore, an intermediate line between these lines is easily obtainable. The position of the lane division (the white line 2) under the lower surface of the vehicle 1 is estimated based on the intermediate line thus obtained. FIG. 16 illustrates an example of estimation of the position of the lane division (the white line 2) achieved by the foregoing method.

According to the present embodiment described herein, the front camera 11F captures an image at earlier timing than imaging timing of the rear camera 11B (refer to FIG. 9). However, when the front camera 11F captures an image after the imaging by the rear camera 11B, the time lag Tbf becomes a negative value. In this case, the shift direction of the lane division (the white line 2) in front of the vehicle 1 becomes the opposite direction. Therefore, the position of the lane division (the white line 2) in front of the vehicle 1 is shifted in the traveling direction of the vehicle 1 by a distance of (the traveling speed V)×(the time lag Tbf).

According to the present embodiment described herein, the lane division (the white line 2) to be corrected is the lane division (the white line 2) in front of the vehicle 1 detected based on the image captured by the front camera 11F. However, the lane division to be corrected is not limited to the lane division (the white line 2) contained in the image of the front camera 11F, but may be the lane division (the white line 2) contained in the image captured earlier by either the front camera 11F or the rear camera 11B. For example, when the front camera 11F captures an image at earlier timing than imaging timing of the rear camera 11B, the lane division (the white line 2) in front of the vehicle 1 (based on the image captured by the front camera 11F) is shifted in the direction opposite to the traveling direction of the vehicle 1. However, when the front camera 11F captures an image after imaging by the rear camera 11B, the lane division (the white line 2) in the rear of the vehicle 1 (based on the image of the rear camera 11B) may be shifted in the traveling direction of the vehicle 1.

In this case, the position of the lane division (the white line 2) is estimated with reference to the image captured at the latest imaging timing corresponding to either the imaging timing of the front camera 11F or the imaging timing of the rear camera 11B. Accordingly, accuracy of estimation increases.

After estimation of the position of the lane division (the white line 2) under the lower surface of the vehicle 1 by the foregoing method (S204 in FIG. 14), the estimated position of the lane division (the white line 2) is output to the vehicle control apparatus 200 (S205). After the output is completed, the lane division estimation process in FIG. 14 ends. Then, the flow returns to the lane detection process in FIG. 7 and FIG. 8.

However, when it is determined in S203 in FIG. 14 that the corrected position of the lane division (the white line 2) in the front area is not matched with the position of the lane division (the white line 2) in the rear area (S203: no), a notification about a condition that the lane division (the white line 2) under the lower surface of the vehicle 1 cannot be estimated is output to the vehicle control apparatus 200 (S206). After the output is completed, the lane division estimation process in FIG. 14 ends. Then, the flow returns to the lane detection process in FIG. 7 and FIG. 8.

After the flow returns from the lane estimation process (S200), it is determined whether to end detection of the lane in the lane detection process illustrated in FIG. 7 (S119 in FIG. 8).

When ending of lane detection is not desired (S119: no), the flow returns to S101 in FIG. 7 to again acquire images from the four vehicle onboard cameras (the left side camera 10L, the right side camera 10R, the front camera 11F, and the rear camera 11B), and starts a series of the foregoing steps. When ending of lane detection is desired (S119: yes), the lane detection process illustrated in FIG. 7 and FIG. 8 ends.

As described above, the lane detection apparatus 100 of the present embodiment is capable of confirming whether the position of the lane division (the white line 2) detected on each of the left side and the right side of the vehicle 1 is valid based on the position of the lane division (the white line 2) detected in front of or in the rear of the vehicle 1. When the vehicle 1 changes the lane during high-speed traveling, the position of the lane division (the white line 2) detected in front or in the rear of the vehicle 1 is corrected. Validity of the position of the lane division (the white line 2) detected on each of the left side and the right side is confirmable based on this correction. Accordingly, the position of the lane division (the white line 2) is detectable with sufficient reliability from the images captured by the left side camera 10L and the right side camera 10R.

There are provided a lane detection apparatus and a lane detection method in various modes according to the present disclosure. For example, according to a lane detection apparatus and a lane detection method in a mode of the present disclosure, a side lane division existing on the side of a vehicle is detected based on an image captured by a side vehicle onboard camera imaging an area around the side of the vehicle. In addition, a front lane division existing in front of the vehicle is detected based on an image captured by a front vehicle onboard camera imaging an area around the front of the vehicle. The position of the front lane division is corrected based on a time lag of imaging timing between the side vehicle onboard camera and the front vehicle onboard camera, and a traveling speed. A comparison is made between the corrected position of the front lane division and the position of the side vehicle division. When both the positions are matched with each other, the detection result of the position of the side lane division is output as a lane detection result.

Even in case of detection of the side lane division based on an image of the side of the vehicle, false detection does not occur. Accordingly, the lane division is detectable with high reliability based on the side image captured from the vehicle. Moreover, the corrected position of the front lane division is compared with the position of the side lane division. In this case, false detection of the side lane division is avoidable even during high-speed traveling of the vehicle. Accordingly, the lane division is detectable with high reliability.

A lane detection apparatus according to an example of the present disclosure detects a lane along which a vehicle travels, based on analysis of images captured by multiple vehicle onboard cameras. The lane detection apparatus includes: a side detection portion that detects a side lane division existing on the side of the vehicle, based on an image captured by a side vehicle onboard camera imaging an area around the side of the vehicle; a front detection portion that detects a front lane division existing in front of the vehicle, based on an image captured by a front vehicle onboard camera imaging an area around the front of the vehicle; a checkup portion that compares the position of the side lane division and the position of the front lane division; and an output portion that outputs the position of the side lane division as a detection result when the position of the side lane division and the position of the corrected front lane division are matched with each other.

While various embodiments, configurations, and aspects of the lane detection apparatus and the lane detection method according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A lane detection apparatus that is mounted on a vehicle including a plurality of vehicle onboard cameras and detects a lane along which the vehicle travels, based on analysis of images captured by the plurality of vehicle onboard cameras, the lane detection apparatus comprising:
   a side detection portion that detects a side lane division existing on a side of the vehicle, based on an image captured by a side vehicle onboard camera imaging an area around the side of the vehicle;
   a front detection portion that detects a front lane division existing in front of the vehicle, based on an image captured by a front vehicle onboard camera imaging an area around the front of the vehicle;
   a traveling speed detection portion that detects a traveling speed of the vehicle;
   a position correction portion that corrects a position of the front lane division based on a time lag of imaging timing between the side vehicle onboard camera and the front vehicle onboard camera, and the traveling speed;
   a checkup portion that compares a position of the side lane division and a corrected position of the front lane division; and
   an output portion that outputs the position of the side lane division as a detection result when the position of the side lane division and the corrected position of the front lane division are matched with each other.

2. The lane detection apparatus according to claim 1, further comprising:
   a time lag acquisition portion that acquires each time lag of imaging timing between the plurality of vehicle onboard cameras at a start of the plurality of vehicle onboard cameras.

3. The lane detection apparatus according to claim 1, further comprising:
   a rear detection portion that detects a rear lane division existing in rear of the vehicle, based on an image captured by a rear vehicle onboard camera imaging an area around the rear of the vehicle,
   wherein:
   the position correction portion corrects a position of the rear lane division based on a time lag of imaging timing between the side vehicle onboard camera and the rear vehicle onboard camera, and the traveling speed;
   the checkup portion compares the position of the side lane division and the corrected position of the front lane division, and compares the position of the side lane division and a corrected position of the rear lane division; and
   the checkup portion detects the lane based on the position of the side lane division in a case where the position of the side lane division and the corrected position of the front lane division are matched with each other and also where the position of the side lane division and the corrected position of the rear lane division are matched with each other.

4. The lane detection apparatus according to claim 3, wherein:
   the position correction portion corrects either one of the position of the front lane division or the position of the rear lane division based on a time lag of imaging timing between the front vehicle onboard camera and the rear vehicle onboard camera, and the traveling speed in a case where the front lane division and the rear lane division are detected and also where the side lane division is not detected;
   the checkup portion compares the corrected position of either the front lane division or the rear lane division, and the position which is not corrected of the front lane division and the rear lane division;
   the lane detection apparatus further comprises:
      a lane division estimation section that estimates a position of a lane division under a lower surface of the vehicle when the checkup portion determines that the corrected position of either the front lane division or the rear lane division and the position which is not corrected of the front lane division and the rear lane division are matched with each other; and the output portion outputs the position of the lane division estimated by the lane division estimation section as a detection result of the lane.

5. The lane detection apparatus according to claim 4, wherein:
the position correction portion corrects the front lane division when the front vehicle onboard camera captures the image before imaging by the rear vehicle onboard camera, and corrects the rear lane division when the rear vehicle onboard camera captures the image before imaging by the front vehicle onboard camera.

6. A lane detection method that detects a lane along which a vehicle travels, based on analysis of images captured by a plurality of vehicle onboard cameras, the lane detection method comprising:
detecting a side lane division existing on a side of the vehicle, based on an image captured by a side vehicle onboard camera imaging an area around the side of the vehicle;
detecting a front lane division existing in front of the vehicle, based on an image captured by a front vehicle onboard camera imaging an area around the front of the vehicle;
detecting a traveling speed of the vehicle;
correcting a position of the front lane division based on a time lag of imaging timing between the side vehicle onboard camera and the front vehicle onboard camera, and the traveling speed;
comparing a position of the side lane division and a corrected position of the front lane division; and
outputting the position of the side lane division as a detection result when the position of the side lane division and the corrected position of the front lane division are matched with each other.

\* \* \* \* \*